United States Patent [19]

McVaugh

[11] 3,736,822

[45] June 5, 1973

[54] MOBILE APPARATUS FOR SALVAGING UNDERGROUND AND OVERHEAD CABLE

[76] Inventor: Arthur K. McVaugh, Box 42, Vernfield, Pa.

[22] Filed: June 14, 1971

[21] Appl. No.: 152,697

[52] U.S. Cl. ...................83/155, 83/320, 83/436, 83/923, 83/928
[51] Int. Cl. ................................................B26d 1/08
[58] Field of Search..................83/310, 320, 155, 83/13; 226/108, 184, 193; 254/134.3 R, 134.3 FT

[56] References Cited

UNITED STATES PATENTS 3,244,292  4/1969  Elliot .......................254/134.3 FT X
3,490,665  1/1970  Johnson...........................226/193 X
3,686,989  8/1970  Dreher..................................83/320

Primary Examiner—Andrew R. Juhasz
Assistant Examiner—John Sipos
Attorney—Henry N. Paul, Jr., John H. Austin and J. Walter Schilpp et al.

[57] ABSTRACT

An apparatus and method is provided for salvaging underground and overhead electrical cable. The apparatus of this invention includes a mobile platform such as a truck on which there is mounted an adjustable cable guide which guides the cable to a cable puller which draws the cable from either an underground conduit or from overhead installation. The cable is then fed to a cable cutter which is synchronized with the rate of feed of the cable so as to cut the cable into predetermined lengths. The cut lengths of the cable are then fed to a truck or the like and hauled away to a smelter for recovery of the metal.

5 Claims, 13 Drawing Figures

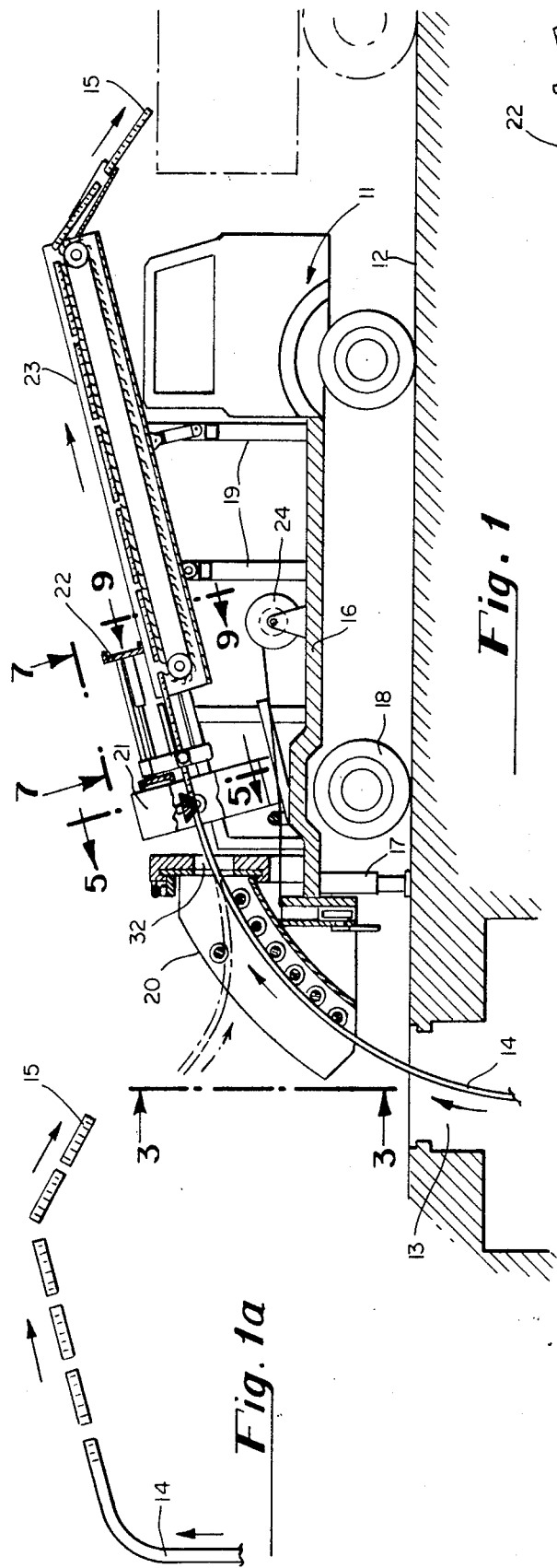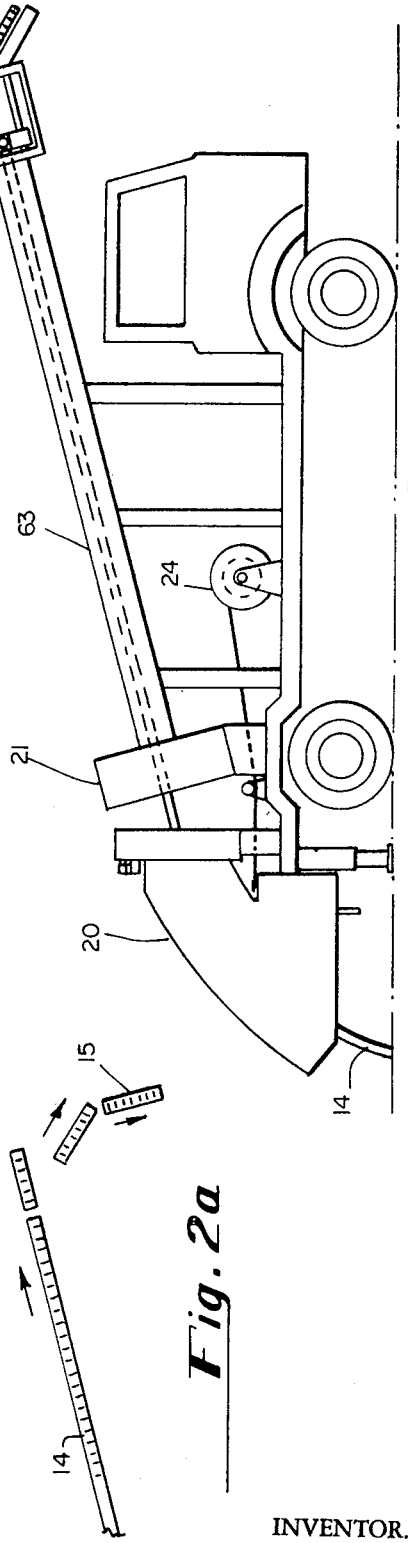

INVENTOR.
Arthur K. McVaugh
BY
Paul & Paul
ATTORNEYS

PATENTED JUN 5 1973 3,736,822

INVENTOR.
Arthur K. McVaugh

BY Paul + Paul

ATTORNEYS.

3,736,822

INVENTOR.
Arthur K. McVaugh
BY
Paul & Paul
ATTORNEYS.

MOBILE APPARATUS FOR SALVAGING UNDERGROUND AND OVERHEAD CABLE

BACKGROUND OF THE INVENTION

1. Field of the Invention

This invention is concerned with an apparatus for salvaging underground or overhead electrical cable.

2. Description of the Prior Art

Public utilities use large amounts of underground electrical cable and to some extent, overhead cable. Electrical power companies use large underground cable for transmission of electricity from the power houses to substations and eventually transformers for use in homes and industries. Other public utilities also use large amounts of underground cable such as telephone companies, telegraph companies, railroads, and subway systems. Furthermore, in most cities there are separate communication systems for police and fire departments that utilize underground cables for transmission of messages as well as for transmission of signals to control traffic lights and the like.

The installation of electrical cables under the ground has many advantages. The cables, in general, last considerably longer since they are not exposed to the adverse effects of the normal weather and are not subjected to adverse weather conditions such as lightning and wind storms or damage caused by automobile accidents.

When installing underground cable, the standard procedure is to initially install a conduit system. The conduit systems usually consist of tubular masonary materials such as concrete pipe, teracotta pipe or the like. The conduit is generally installed and buried underground. Conduit is generally installed in sealed units which are about one city block in length, that is, about 500 to 800 feet. The conduit opens at both ends into a manhole which is usually located in the street near an intersection.

When installing new cable in newly installed conduit, the cable is drawn through the conduit from the manhole with a winch or the like. If the conduit is sufficiently large, there is relatively little resistance to the passage of the cable through the conduit. This process, however, is still relatively slow because of the rather heavy weight of the lengths of the cable employed.

As is well known to those skilled in the art, underground cable does not last indefinitely, and must be periodically replaced. The insulation on the cable deteriorates, and the copper of which most cables are made, become corroded, which adversely affect the transmission of electricity. Unlike installing new cable in new conduit, the removal of the old cable from the conduit can be quite difficult and costly. The cable, being considerably older is weaker and is more likely to rupture inside the conduit. Furthermore, the dirt which inherently accumulated in the conduit after many years can almost cement the cable to the walls of the conduit. A still further problem encountered in removing old cable from conduit is that often, the conduit has cracked, and tree roots have grown into the conduit and about the cable making it extremely difficult to remove the cable from the conduit. Accordingly, heretofore, removing and recovering the old cable was often quite difficult and costly from a labor standpoint.

The scrap value of the cable once it is recovered, is quite high because of the large amounts of copper, lead, and other metals in the cable. It is not unusual, for example, for each foot of cable to contain over ten pounds of copper. However, the cost of salvaging the cable generally is so high that if the conduit is large enough to hold both the old cable and the new cable, it is not unusual to simply cut off the old cable and abandon it in the conduit and then install the new cable beside the old cable in the conduit. This practice, however, is of course limited by the size of the conduit. The conduit once filled with old abandoned cable has to be stripped in order to install new cable.

One method which is commonly used to remove cable from underground conduit is to position a winch above the manholes at the two ends of the cable and then gradually pull the cable back and forth until it finally loosened somewhat and can be pulled from one of the manholes. This cable is then wound directly on an empty cable reel. These reels once filled up with scrap cable then have to be picked up with special apparatus and hauled to the scrap yard. At the scrap yard, the cable is then unwound from the reel and sheared into suitable lengths for the purpose of smelting to recover the copper and other metals in the cable.

A still further process which has been heretofore suggested is to intermittantly pull a predetermined length of cable with a winch like apparatus. The winch is then stopped and the cable is cut into short lengths. This procedure is repeated until all of the cable is removed from the conduit. The above described procedure is highly unsatisfactory in actual practice. The amount of force required to start the cable once at rest is quite substantial. This can be readily appreciated from the fact that it is not unusual to have to pull a length of cable 500–800 feet long, which is the distance between two manholes. The cable may weigh anywhere between 10 and 15 pounds per foot. Accordingly, the winch is required to intermittently start a length of cable from a static position which may weigh between 5,000 and 12,000 pounds. The apparatus used in this procedure is therefore periodically subjected to a considerable amount of force. As can be readily appreciated, the necessity of intermittantly starting a length of cable which initially weighs between 5,000 and 12,000 pounds creates a considerable amount of strain on the pulling apparatus. In actual field tests, it was found that this type of apparatus has a very short tool life. It will literally break down in a matter of weeks by falling apart due to the great amount of force required to be intermitantly applied by the apparatus. In addition, the lengths had to be cut into a suitable size for handling. The lengths were cut to at most about 5–8 feet. This meant that in a typical block, about 100 separate pulling and cutting steps were required to completely remove the cable.

Other types of apparatus and methods have heretofore also been suggested for removing the cable from underground conduit and for recovering the cable from the overhead lines. However, these apparatuses at best only serve the function of facilitating the installation of the new cables in that the cash value of the scrap cable was generally considerably offset by the amount of labor required to recover the cable.

It is accordingly a primary object of this invention to overcome the aforementioned problems and disadvantages of the apparatuses and methods heretofore utilized for the recovery of underground and overhead cables.

It is another object of this invention to provide an apparatus for recovering overhead and underground cable which can be operated in an efficient manner so as to facilitate the salvage and recovery of the maximum scrap value of the recovered cable.

It is still further an object of this invention to provide an apparatus which is useful for recovering scrap cable in a form which can be readily hauled away for the purposes of salvage.

It is still a further object of this invention to provide an apparatus for both recovering scrap underground cable and assisting in the installation of new cables in underground conduits.

Other objects and advantages of this invention will become further apparent hereinafter, in the drawings and from the reading of the subjoined claims.

SUMMARY OF THE INVENTION

The objects of the invention have been achieved by providing an apparatus wherein the cable to be recovered is initially guided up a guide ramp to a puller means. The puller means grips substantially the entire circumference of the cable with teeth which dig into and grip the cable. The puller can draw the cable either from an underground conduit, or an overhead installation in a continuous manner. The cable is cut into predetermined lengths as the cable is simultaneousely continuously being drawn by the puller means. The cut lengths of cable, suitable for use in a smelter are then hauled away.

BRIEF DESCRIPTION OF THE DRAWINGS

FIG. 1 is a schematic illustration in partial cross section of the preferred embodiment of this invention.

FIG. 1a is a schematic illustration of the flow of cable as it is fed through, and cut by the apparatus of FIG. 1.

FIG. 2 is a schematic illustration of an alternate embodiment of the apparatus of this invention.

FIG. 2a is a schematic illustration of the flow of cable as it is fed through and cut by the apparatus of FIG. 2.

FIG. 9a is an illustration in partial cross section of the slats of the conveyor means taken as indicated by the lines and arrows 9a—9a.

DESCRIPTION OF THE PREFERRED EMBODIMENTS

Figure 3:
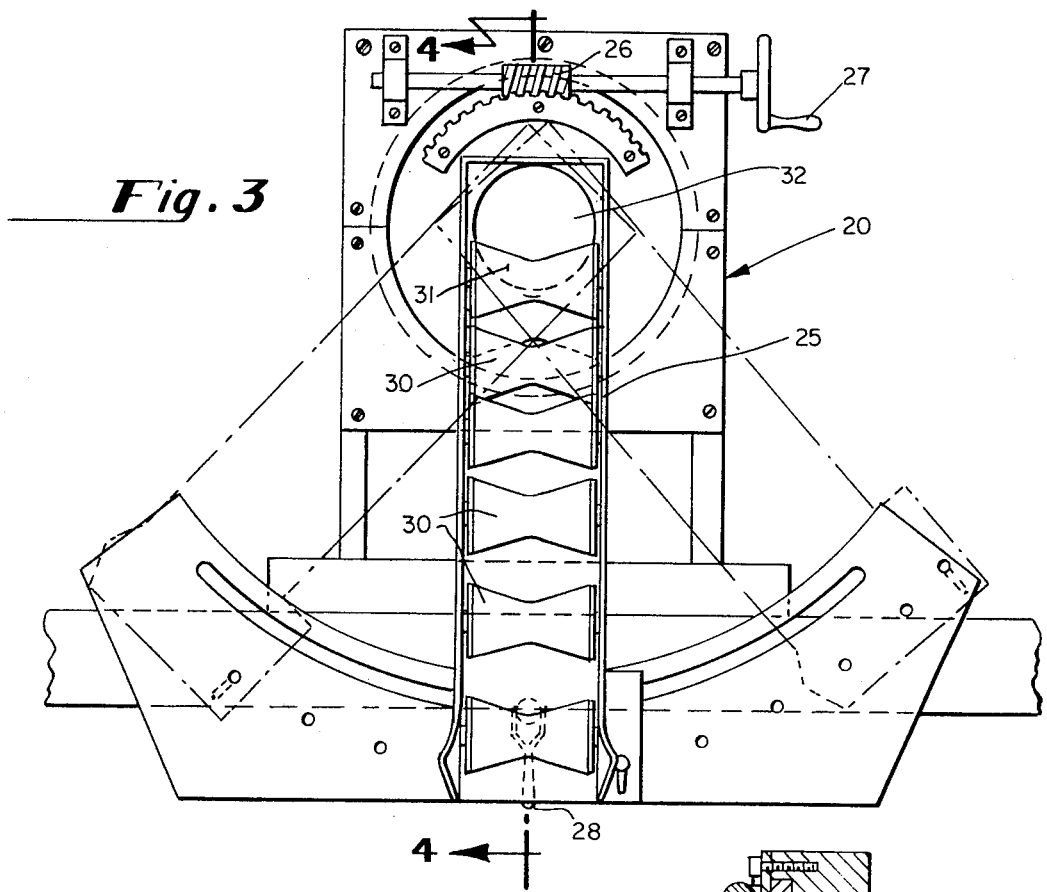
FIG. 3 is an illustration of the adjustable cable guiding means of FIG. 1 taken as illustrated by the lines and arrows 3—3 of FIG. 1.
Figure 4:
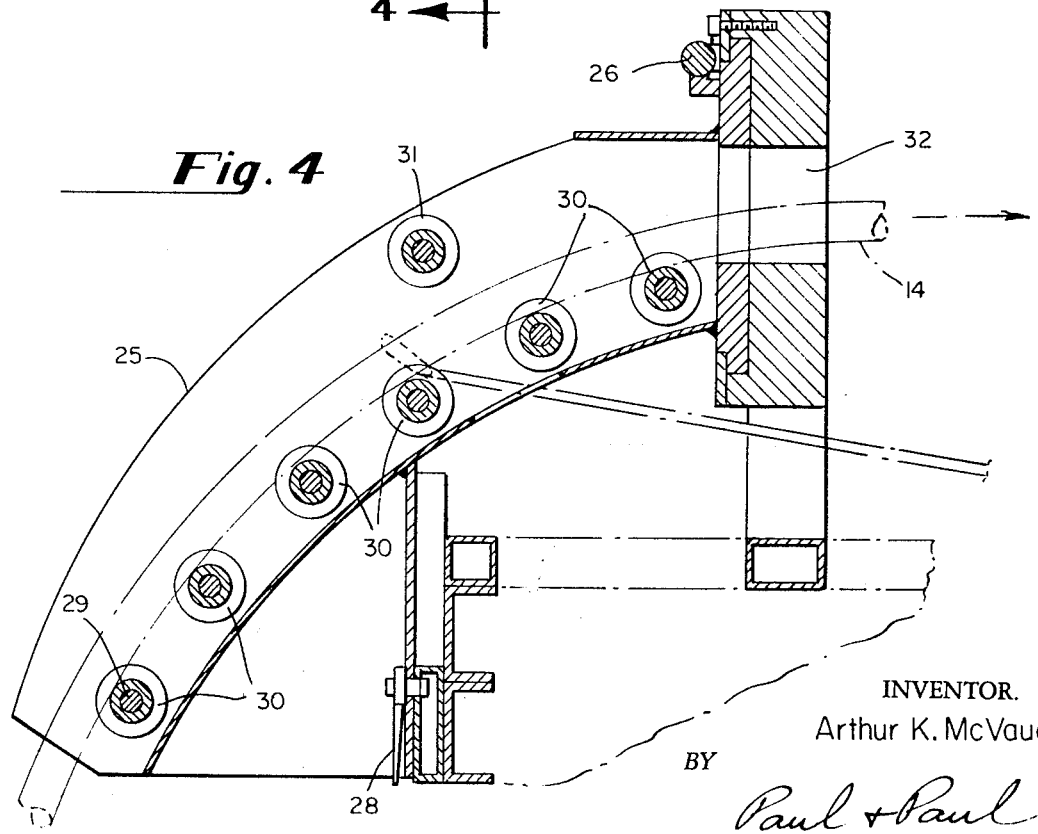
FIG. 4 is a cross sectional illustration of the cable guiding means taken as illustrated by the lines and arrows 4—4 of FIG. 3.

The preferred apparatus of this invention 11, is shown in FIG. 1. The apparatus 11 is illustrated positioned on a solid surface, for example, a street 12. The rearward portion of the apparatus is shown positioned over a manhole 13 from which a cable 14 is being removed. The cable 14 is fed through the apparatus 11 as illustrated in FIG. 1 and FIG. 1a. The cable is cut into short lengths 15 which are conveniently dumped into a vehicle such as a dump truck or trailer. When the vehicle is filled, it is taken to a smelter for recovery of the metals such as copper and lead which comprise the cable. The apparatus of this invention 11 is mobile, being readily moveable from location to location and is preferably self-propelled.

The apparatus 11 consists of mobile platform 16 which as illustrated is preferably a heavy duty truck having a relatively short wheel base. It should be appreciated, however, that the mobile platform 16 of the apparatus 11 can also be a trailer which can be towed from place to place by suitable means such as a truck or the like. The mobile platform 16 includes a pair of support jacks 17 which can be extended downwardly until they contact a solid surface 12, for example, the street and then used to raise the entire apparatus 11 so as to take the load off the wheels 18 of the mobile platform. The mobile platform 16 includes a support structure 19 which is secured to the support platform 16.

The portion of the apparatus which is used for pulling and cutting the cable can be considered to consist of a plurality of integrated units. The apparatus 11 consists of a guiding means 20, a cable pulling means 21, a cable cutting means 22, and a conveyor means 23. A supplemental piece of equipment which is highly useful in the initial start-up of the apparatus is a winch 24 which is positioned on the mobile platform 16 to assist the initial lead in of the cable 14 from the manhole 13. Each of the units 20, 21, 22 and 23 of this apparatus 11 are synchronized so as to provide continuous feed and intermittant cutting of the cable as it is recovered. The cable 14 after it is cut into suitable lengths, is hauled away as noted above by a separate vehicle.

In order to further illustrate the subject invention each of the separate units comprising the apparatus 11 of this invention, will be discussed in detail. It should be appreciated however, that the invention resides in the total combination of elements which cooperate together.

The guiding means 20 which is shown in FIG. 3 consists of a guide ramp 25 which may be moved in an arcuate direction either the left or right as shown in phantom in FIG. 3. The guide ramp is moved by the worm and rack assembly 26 which is rotated by the handle 27. Once the guiding ramp 25 is in the desired position, it is held in place by the lock lever 28. The guide ramp consists of a number of rollers which are of a double conical configuration which guides the cable 14 along the center of the guide ramp 25. There is a number of lower guide rollers 30 which are used to guide the cable when it is recovered from below the apparatus as for example, a manhole. In addition to the lower guide rollers there is an upper guide roller 31 which is utilized when recovering cable from overhead installations. The cable, whether recovered from a manhole or from an overhead supply, is guided at the top of the guide ramp 25 through an aperture 32 provided in the forward section of the guiding means.

One of the most important sections of the apparatus of this invention is the cable pulling means 21. As shown in the preferred embodiment, this consists of four separate driving units which are positioned circumferentially about the cable 14 being fed so as to grip as much of the circumference of the cable as possible, and advance it. It should be noticed that in the embodiment of FIG. 5, that four bevel gears 33 are positioned about the cable. Each bevel gear is moveable inwardly or outwardly so as to adjust the spacing between the bevel gears 33 so as to securely grip a given size cable. The position of the bevel gears 33 is adjusted relative to the diameter of the cable 14 being pulled so as to grip the cable 14 with the teeth 34 of the bevel gear dug into the cable to firmly grip the cable but not enough to rupture the cable 14. Each of the bevel gears 33 in addition to being forced into the cable are also driven so as to positively advance the cable 14, forwardly towards the cutter means 22. It is highly important in accordance with this invention that the cable be driven by all of the bevel gears 33 in order to balance the amount of force required to continuously pull the relatively heavy weight of cable through the apparatus of this invention 11.

Figure 5:
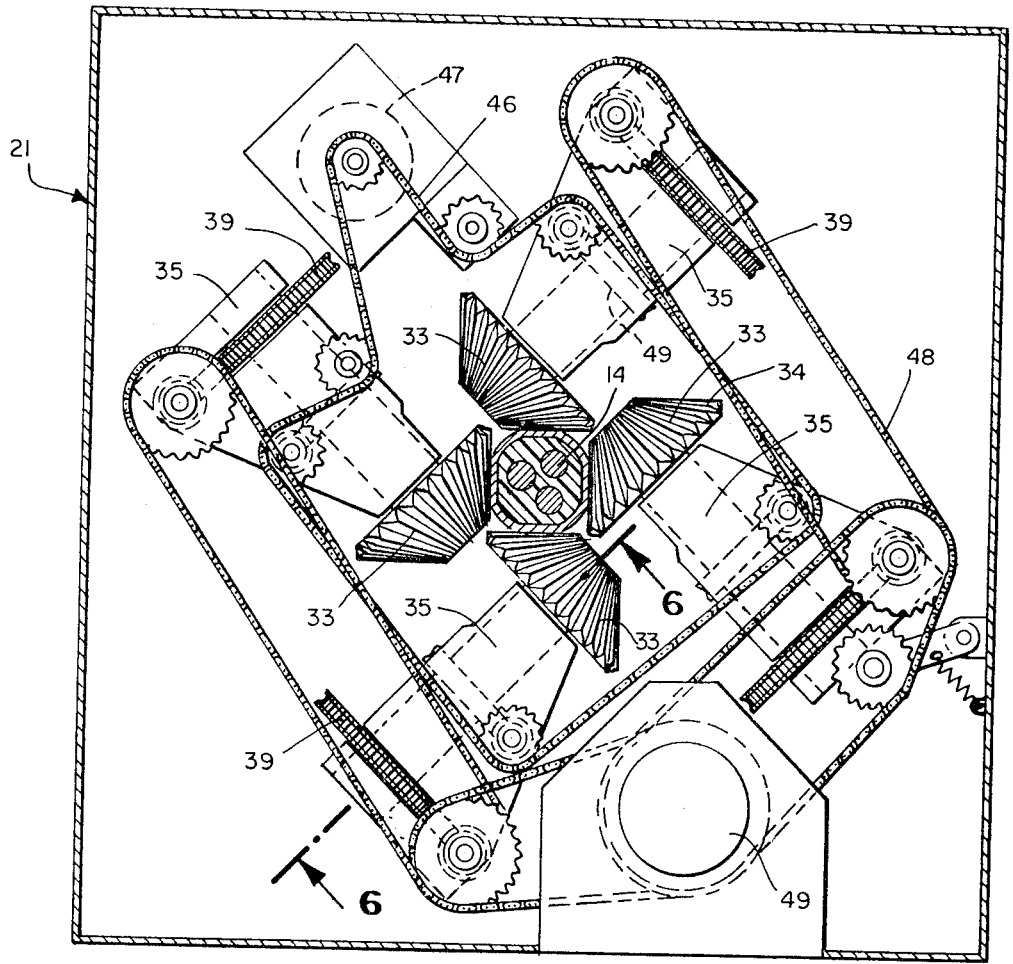
FIG. 5 is a cross sectional illustration of the cable puller means of the apparatus of FIG. 1 taken as indicated by the lines and arrows 5—5 of FIG. 1.
Figure 6:
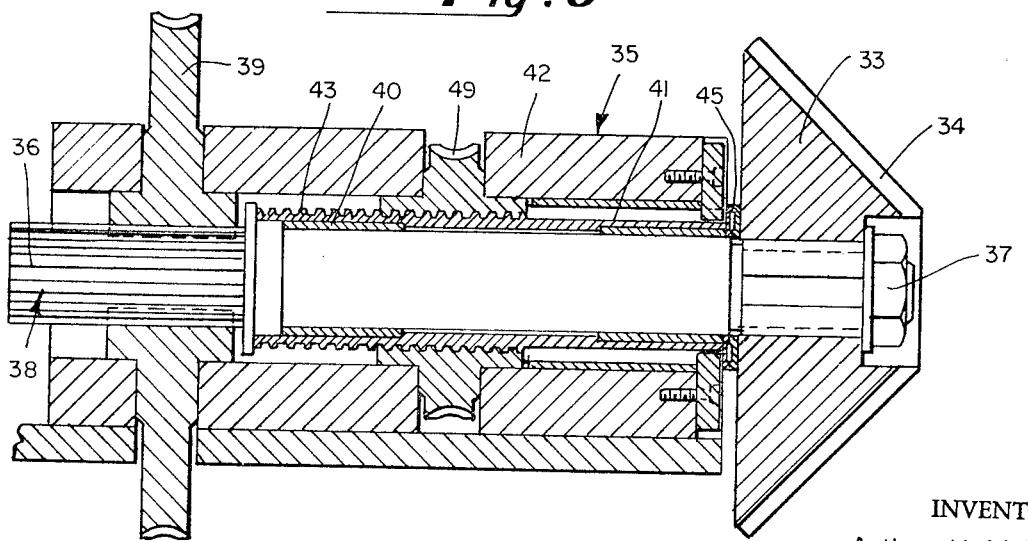
FIG. 6 is an illustration in cross section of one of the driving units of the cable pulling means taken as indicated by the lines and arrows 6—6 of FIG. 5.

As shown in FIG. 5 each of the bevel gear units are identical except for their relative position about the cable. The driving means 35 as illustrated in FIG. 6 is comprised of the bevel gear 33 into which teeth 34 are cut. The bevel gear 33 is secured to the shaft 36 by means of a nut 37 so as to move in direct response to movement of the shaft 36. The shaft 36 at the opposite end has a plurality of splines 38 about its entire circumference. These splines 38 are engaged with mating splined hub portions of a worm gear 39 so that when the worm gear 39 is driven, the shaft 36 is likewise driven which in turn rotates the bevel gear 33. Because of the splines 38 on the terminal end of the shaft 36, the shaft can move inwardly or outwardly with respect to the worm gear 39. As noted above, it is the rotation of the worm gear 39 in combination with the splined shaft 36 which causes the bevel gear 33 to rotate and drive the cable 14 forwardly through the apparatus of this invention.

It should be appreciated, however, that the size of the cable being recovered can vary considerably. Accordingly, in order to compensate for variations in the diameter of the cable, a second means is provided within each of the driving units 35 in order to either advance or retract the bevel gear 36 toward the cable being pulled. This means consists of a quill 40 which has a key 41 and its forward end which prevents rotational movement with regard to the housing 42. At the opposite end, there is an acme thread 43 which is engaged with a driven worm gear 44. Driving the gear 44 causes the quill to either advance towards the bevel gear 33, or move rearwardly towards the splined end of the shaft 36. Depending on the relative position of the quill, the spacing between each of the bevel gears 33 of the cable puller means 21 is either enlarged or decreased. It should be noted that the quill forces the bevel gear forwardly into the cable. A thrust bearing 45 is positioned between the bevel gear and the quill in order to take the load of the quill to the bevel gear.

As can be seen in FIG. 5 there are two separate drive chains in the cable pulling apparatus 11 of this invention. A first drive chain 46 drives the worm gear 44 in engagement with the acme thread on the quill 40. This causes the bevel gears 33 to either advance or to retract in accordance to the direction of movement of the chain 46. The chain 46 is driven by a first motor 47. The second drive chain 48 drives the main worm gear 39 which in turn rotates the bevel gears 33 causing the cable to be advanced. This chain is driven by a second motor 49. The arrangement of the cable puller means 21 shown in FIG. 5 is unique with regard to its ability to adjust to various sizes of cable and to vary the rate of speed to the apparatus. As quite obvious from the above description, the first drive chain 46 moves each of the bevel gears into a predetermined position which is dictated by the relative diameter of the cable being recovered. Since each of the drive units 35 positioned about the cable are identical in configuration, and are synchronized so as to advance the cable at a predetermined rate, it can be seen that a wide variation of different cable sizes can readily be accomplished by activating the motor 47 which controls the relative position of the bevel gears to each other and to the cable being recovered. Furthermore, since each of the gears is simultaneously driven by the second motor 49 it can be seen that an equal amount of force is applied about the circumference of the cable. This is highly important with regard to cable which is weakened in that it distributes the forces over a wider area of the cable enabling the cable to be pulled with considerably greater ease than if one side or even two sides of the cable are engaged by the pulling means.

Figure 10:
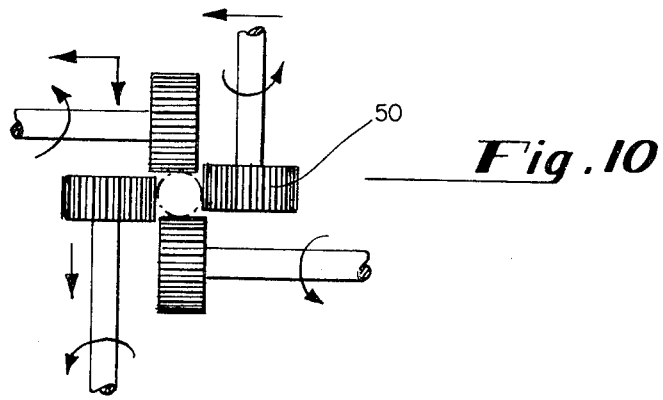
FIG. 10 is a schematic illustration of an alternate embodiment of the cable pulling means which can be utilized with the apparatus of this invention.

It should be carefully noted, however, that while the bevel gear arrangement described in detail above, is the preferred embodiment of this invention, that the pulling apparatus of this invention is not limited as to the use of bevel gears and that other types of apparatus can readily be employed in the apparatus of this invention without departing from the spirit or scope of this invention. For example, by referring to FIG. 10, can be seen an alternate embodiment which has proven to be highly satisfactory. In this particular embodiment, four spur gears 50 are positioned relative to each other so as to move in the positions indicated by the arrows. Due to the relative movement of the gears, various sizes of cable can be accomodated between the spur gears. Further, since the spur gears cut into the side of the cable at right angles, to the direction of advancement, the optimum amount of force is applied to the cable which causes it to more readily advance. It is highly advantageous in utilizing this embodiment to include a sun gear drive and satellite gears, plus an inside gear in the spur gear to increase the amount of force applied to the spur gears as they are pulling the cable 14.

Figure 7:
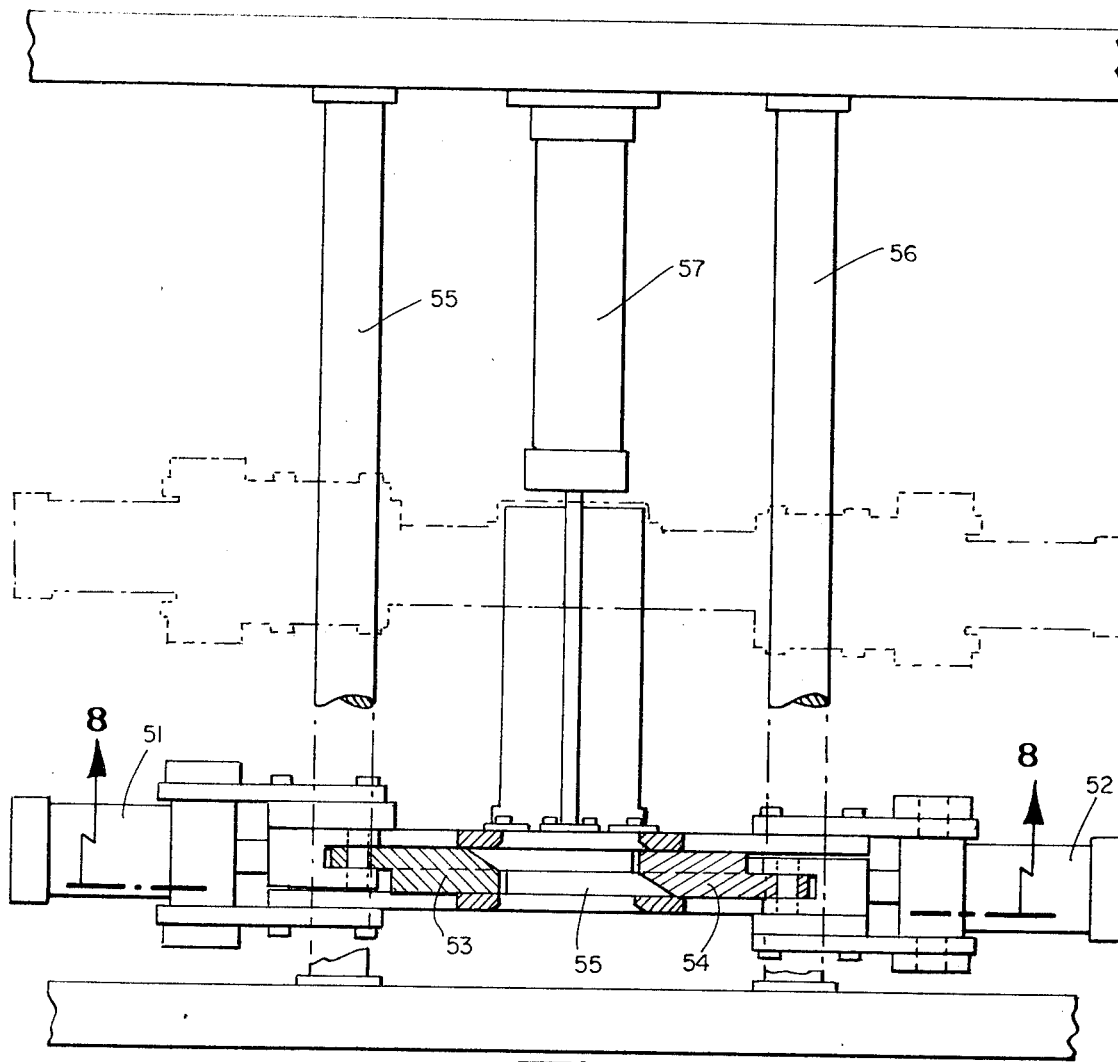
FIG. 7 is a top plan view in partial cross section of the cable cutting means taken as indicated by the lines and arrows 7—7 of FIG. 1.
Figure 8:
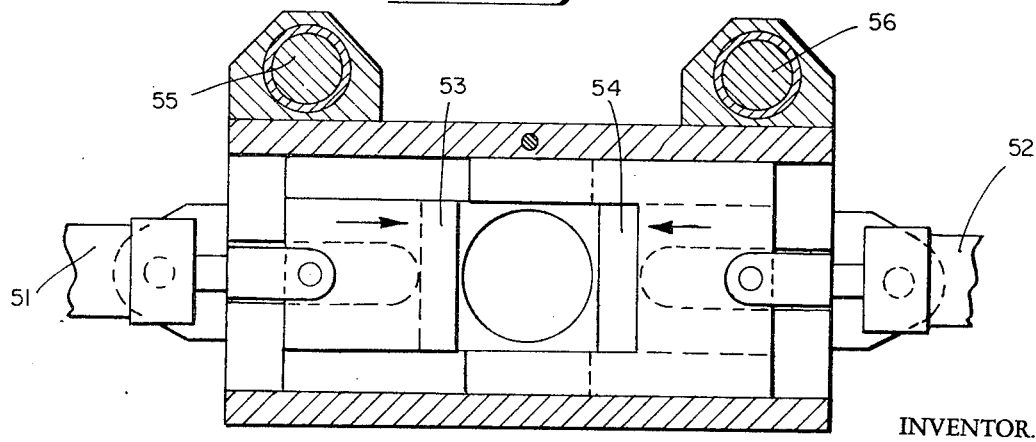
FIG. 8 is an illustration of the cable cutting means in partial cross section taken as indicated by the lines and arrows 8—8 of FIG. 7.
Figure 9:
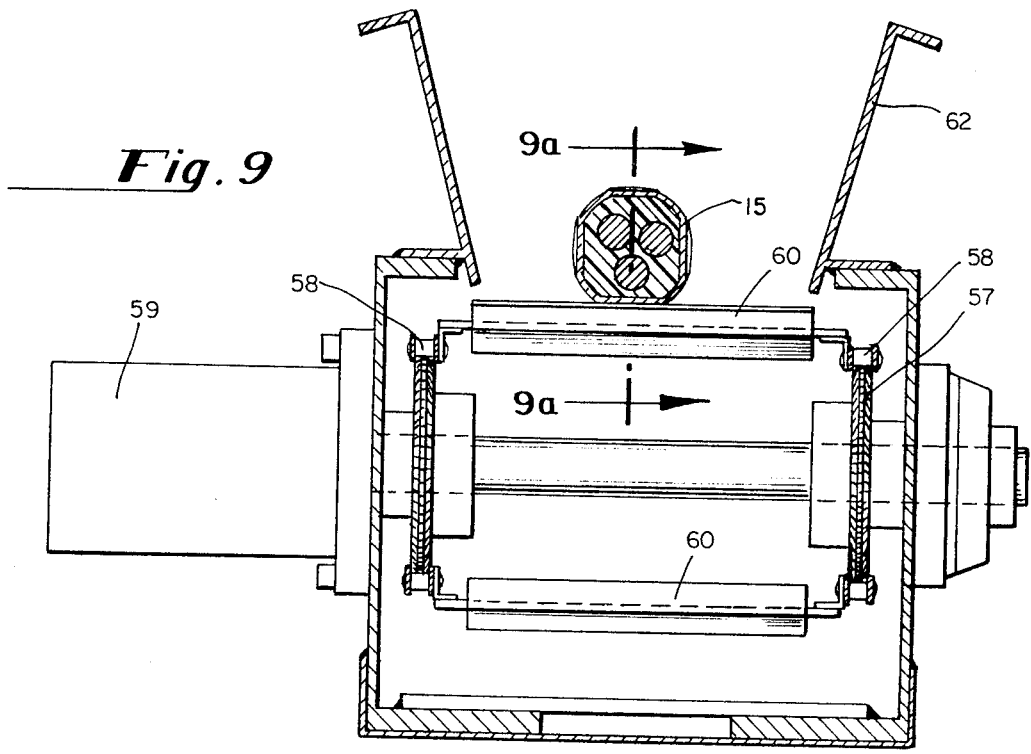
FIG. 9 is a cross sectional illustration of the conveyor means of the apparatus of FIG. 1.
Figure 9A:
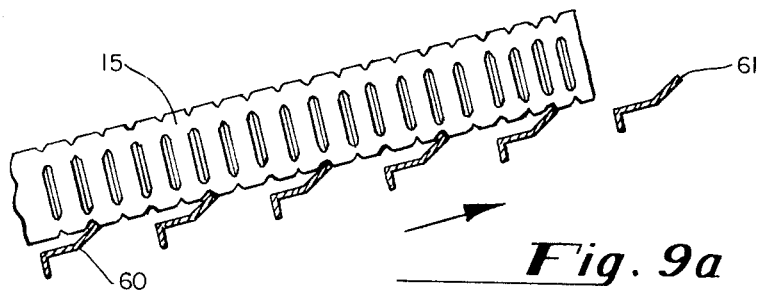

As the cable 14 is recovered by the cable pulley means from the manhole or recovered from an overhead cable line, in order to achieve the objects of this invention, it is necessary that the cable be cut into predetermined lengths so as to be easily removed by the dump truck or the like as shown in FIG. 1. As was pointed out above, it is important that once the cable is moved, that the momentum of the cable 14 not be interrupted in order to achieve the maximum utilization of energy and to maintain the machine in good operative order. Accordingly, in the apparatus of this invention the driving means once started continuously runs the feeding cable 14 to the cable cutting means 22. The cable cutting means as illustrated is basically of the guillotine type. The apparatus consists of a pair of hydraulic cylinders 51 and 52 which are positioned in opposing relationship to each other. Attached to the ends of the hydraulic cylinders are mating guillotine blades 53 and 54, which are positioned so when in the open position, the cable will readily feed through the opening 55 between the blades. However, when the blades are closed there is a slight overlap and the cable 14 is completely severed. The cable cutting means 22 is mounted on a pair of guide rods 55, 56, so that when the guillotine cutting means is advanced in a forwardly direction it is guided in the same direction of travel as the cable being fed by the cable pulling means. A return hydraulic cylinder 57 is positioned so as to operate in the opposite direction to the direction of advancement of the cable. The hydraulic cylinder 57 is positioned so as to return the guillotine cutting means 52 from the position indicated in phantom on FIG. 7 to the position indicated in full in FIG. 7. The cable 14 enters the guillotine and the cylinders 51 and 52 are activated. The blade 53 and 54 advance towards the cable passing through the aperture 55 of the guillotine. As soon as the blades 51, 52 engage cable 14 they start to cut the cable. The cable cutting apparatus 22 travels along with the cable as the guillotine blades are cutting the cable. As soon as the cable is cut, for example, the hydraulic cylinders 51 are then automatically released and draw back the guillotine blades. The return hydraulic cylinder 57 is then activated and returns the guillotine assembly to the starting position shown in full in FIG. 7. In this position it is again ready to engage and cut another length of cable which is continuously being fed by the cable pulling means 21.

It should readily be appreciated that while the guillotine cutting means which is illustrated, is the preferred embodiment of this invention, that the other types of apparatus can likewise be employed in the apparatus of the present invention. For example, it would also be feasible to utilize a traveling radial saw to cut the cable, or in the alternative, to use an apparatus similar to scissors to shear the cable into sections. The important thing in this particular apparatus is that the cable is cut on the move as it is being continuously removed from the conduit.

Once the cable is cut into lengths, it is removed by means of a conveyor means 23. The conveyor means 23 is of relatively conventional design. It consists of drive chains 58 which are driven by a motor 59. Positioned between and attached to the chains 58 on each side of the conveyor is a plurality of slats 60 which have upwardly extending lips 61 which are adapted to engage the cable, particularly in the grooves caused by the gear pulling means. The conveyor belt for the purposes of safety includes side members 62 on each side of the conveyor. The cable is advanced to a guide ramp from which it is dumped into a suitable vehicle for removing the salvaged scrap cable to the smelter.

In the apparatus of this invention 11 there is further included a winch 24 mentioned above. This winch 24 serves several useful purposes when employing the apparatus of the present invention, as will be explained in greater detail below. The winch is of relatively conventional design, preferably being motor driven.

In operation, the apparatus of this invention 11, is moved to a position wherein the guide means 20 is approximately aligned with an area from which the cable is to be removed, as for example, a manhole. It should be appreciated, however, that in certain situations, the manhole will either be very close to the curb or possibly on the sidewalk, or extended a considerable distance into the street whereupon it is necessary utilizing the adjustment means of the cable guiding means, to swing the guide ramp 25 into the appropriate position so as to have as direct a draw as possible of the cable from the manhole 13.

If there is a sufficient length of cable in the manhole the cable can simply be led directly into the cable puller means. However, under normal circumstances, it is generally necessary to initially draw the cable 14 to the cable puller means 21 by the winch 24. In this procedure the truck is backed up over the manhole as noted above, and the cable guiding means is adjusted to the proper angle. The support jacks 17 are raised so as to take the weight off the wheels of the vehicle. The lead line from the winch 24 is then attached to an end of the cable 14 and the cable 14 is gradually worked up the guiding means in the conventional manner heretofore employed until the end of the cable is engaged by the puller means.

The bevel gears are retracted and a lead portion of the cable goes forwardly through the opened cable pulling means. Then the bevel gears are tightened down onto the cable. The amount of tightening required in order to get the maximum utilization from the apparatus of this invention 11 will vary depending upon the particular type of cable being pulled. For example, if an armored cable is being pulled, the gear teeth should advantageously be dug into the cable an amount sufficient to have the teeth of the bevel gears inbedded into the outer core enough to contact but not rupture the strands of the cable. Then all of the gears are advanced so as to pull the cable forwardly from the manhole. The cable, once it is fed through the cable advancing means is engaged by the guillotine cutting means. The hydraulic cylinders 51,52 are activated and the blades move inwardly until they contact the cable and press inwardly and grip the cable and as they continually cut through the cable. The guillotine cutting means is carried forwardly by the cable as it is advanced by the cable pulling means. The amount of force applied by the cylinders of the guillotine cutting means are regulated so that the cutting is complete before the guillotine reaches the end of its cycle. The pressure is released from the guillotine blades, and the blades 53,54 are retracted. The guillotine is then retracted to the starting position and by the return hydraulic cylinder 57, and cuts another predetermined length of cable. The method of cutting the cable can best be seen in FIG. 1a. The cable is advanced over the guiding means and then is gripped by the cutting means. It is then cut into predetermined lengths by the cutting means and dropped into a suitable vehicle such as a dump truck or other receptacles.

The apparatus of this invention is especially useful in recovering abandoned cables and also for removing cable from the conduit for the purpose of putting in new cables. It should be appreciated, however, that the use of this invention is not limited to the above mentioned techniques, but has broader applicabilities than that noted above. For example, it can be readily used to recover overhead cable, as was shown in phantom in FIG. 1 by the dotted cable line.

In addition, it should be appreciated that the apparatus of this invention can be used to both pull the old cable from the conduit, and likewise also pull in new cable at the same time. It should be appreciated for example, that the pulling means illustrated in FIG. 5 can apply at least 30,000 pounds of pressure to the cable being processed. Accordingly, the old cable in the conduit can be removed and the new cable attached to the terminal end of the old cable and pulled into the conduit by the old cable from the opposite end. In this manner, the old cable acts as a guide and leads the new cable through the conduit as the old cable is removed.

It should be further appreciated that the apparatus of this invention is not limited to the specific embodiment shown in the aforementioned illustration. Various modifications can be made without departing from the spirit or scope of this invention. As noted above, for example, in FIG. 10 the bevel gears as illustrated in the preferred embodiment can be replaced with conventional spur gears and still obtain a highly satisfactory apparatus. Furthermore, as noted above, other types of cutting means can be employed to cut the cable into predetermined lengths. It should be further noted that certain items of this apparatus can readily be removed without departing from the spirit and scope of this invention. For example, as shown in FIG. 2 it is possible and to some extent highly advantageous, to utilize an apparatus in which the cable guiding means and the cable pulling means are essentially identical to those of FIG. 1. However, the conveyor is eliminated by simply allowing the cable to be pushed by the cable puller through a long tubular member 63 with the guillotine cutting means being positioned at the terminal end of the tubular member. The operation of this apparatus is most clearly seen in FIG. 2a wherein the length of cables is supported by its own column strength up to the terminal end of the tubular member and then is cut into the predetermined length desired.

The apparatus of FIG. 1 is generally preferred in that it has wider applicability and can be used with almost all types of cable generally found in electrical systems. It has the disadvantage over the embodiment of FIG. 2 in that it requires additional moving parts namely the conveyor belt, in order to move the cut cable from the cutting means to the dump means. However, it has the advantage as noted above that it can be used on a wide variety of cables, including the rather heavyweight armor shield cable as well as the more difficult to handle bundle of cables. The apparatus of FIG. 2 is especially useful for recovering the heavy armored cable since armored cable has considerable column strength, and can readily be pushed by the cable puller means. A further disadvantage of the apparatus as disclosed in FIG. 2 is that the cable pulling means must both pull the cable from the manhole and also push the cable up the tubular member to the cutting means. This means that the puller means is required to do extra work. Much of this work is relieved by the use of the conveyor belt as shown in FIG. 1 since the conveyor belt carries the cut cable to the truck for purposes of removal.

I claim:

1. Apparatus for salvaging electrical cable from underground and/or overhead installations, said apparatus comprising, in combination;
    a. a mobile platform having forward and rearward ends;
    b. cable-guide means positioned on said platform adjacent the rearward end thereof, said guide means having an aperture in its forward portion and means for guiding said cable through said aperture;
    c. cable-pulling means mounted on said platform immediately forward of said cable-guide means;
    d. said cable-pulling means including a group of power driven assemblies each including a laterally-extending shaft having a bevel gear at the inward end thereof and a splined portion at the outward end thereof, said shafts being so positioned as to cause said bevel gears to form an aperture in line with the aperture in said cable-guide means, each of said bevel gears when rotated about the axis of its shaft causing its teeth to engage, penetrate and grip a cable in its aperture;
    e. means for adjusting the positions of said bevel gears relative to each other, thereby to adjust the size of the formed aperture, thereby to accomodate to cables of different diameters, said adjusting means including a non-rotatable sleeve in which each gear shaft is rotatably mounted, and power drive means, including a rotatable nut engaging said sleeve, to more said sleeve in its axial direction;
    f. cable-cutting means mounted on said platform forwardly of, and in alignment with, said cable-pulling means; and
    g. means for withdrawing said cable-cutting means from the cable path and for returning said cutting means to a rearward position.

2. Apparatus according to claim 1 wherein said power driven assemblies include at least four such assemblies spaced equally about said formed aperture in said cable-pulling means for gripping and advancing said cable through said cable--pulling means.

3. Apparatus according to claim 2 wherein said bevel gears are driven rotatably by a common drive means, and the positions of said bevel gears are adjusted by common adjustment means.

4. Apparatus according to claim 3 wherein conveyor means is provided forwardly of said cable-cutting means and in alignment therewith for conveying cut lengths of cable forwardly.

5. Apparatus according to claim 3 wherein said cable-cutting means includes:
    a. a pair of opposing guillotine blades;
    b. a pair of opposing hydraulic cylinders each having a piston attached to one of said blades for advancing said blades toward each other and for withdrawing said blades;
    c. means for advancing said blades and cylinders in the same direction of travel as said cable during the cutting operation and for thereafter retracting said blades and cylinders in the opposite direction.

* * * * *